Patented Apr. 29, 1952

2,595,076

UNITED STATES PATENT OFFICE 2,595,076

SELECTIVE FLOTATION OF ZINC

Luther G. Hendrickson, Percy L. Dixon, and Burton E. Lyle, Flin Flon, Manitoba, Canada, assignors to Hudson Bay Mining and Smelting Co., Limited, Winnipeg, Manitoba, Canada, a corporation of Canada No Drawing. Application September 19, 1949, Serial No. 116,612

2 Claims. (Cl. 209—167)

This invention relates to improvements in froth flotation and more specifically to a new process whereby a more complete separation of zinc sulphides is possible from pulps containing other metallic sulphides and non-sulphides.

Due to the fact that many terms used in the flotation art have come to be used in different senses in different areas, and for purposes of exactness of expression herein, it is intended that the following words and phrases whenever they appear hereafter shall be given the interpretations set forth below:

"Aeration" means introduction of air or other oxygen containing gaseous media to the pulp to modify the surface characteristics of the mineral particles without the removal of froth.

"Agitation" means agitation of the pulp either by mechanical means or by a combination of mechanical means and aeration.

"Alkalizing agent" means a substance which is added to the pulp in order to produce therein a pH substantially above 7.0 and for further clarity but not so as to restrict the generality of the foregoing, the term "Alkalizing agent" is intended to include lime, slaked lime, sodium hydroxide, potassium hydroxide, sodium carbonate and potassium carbonate.

"Conditioning" means treatment of the pulp with various reagents under suitable conditions of agitation and temperature to render at least one of the valuable and mineral constituents of the pulp more amenable to flotation.

"High temperature" means any temperature within the range of from 80° C. to the boiling point of the pulp.

"Medium temperature" means any temperature within the range of from 60° C. to 80° C.

"Flotation" means the formation of a froth capable of removal from the surface of the pulp and containing a high proportion of valuable mineral constituents of the pulp by means of the introduction to the pulp of suitable flotation reagents, agitation and introduction to the pulp of finely divided, dispersed gaseous bubbles of suitable size in manner well known in the art.

"Flotation reagent" means any substance which when added to the pulp renders valuable mineral particles contained therein more amenable to flotation.

In the ordinary treatment of copper-zinc ores the copper minerals are first floated to form a copper concentrate and then the zinc is floated to form a zinc concentrate. The separation is never perfect, and usually a considerable quantity of the zinc finds its way into the copper concentrate. When the copper concentrate is smelted the copper, gold, and silver are recovered but the zinc is lost into the smelter slag. Not only is this zinc lost, but as zinc is an undesirable slag constituent, most copper smelters impose penalties for excessive zinc occurring in a copper concentrate sold to them.

According to the invention the above difficulties are reduced to a minimum by a process comprising de-activating the mineral particles in the pulp by aeration at a high temperature with violent agitation, selectively re-activating the zinc sulphide mineral particles by a treatment conducted at a medium temperature with gentle agitation, and subsequently floating the zinc sulphide minerals under conditions of gentle agitation. Preferably, according to the invention, the reactivation process at a medium temperature comprises treatment of the pulp with an alkalizing agent with aeration and gentle agitation, and addition of copper sulphate with gentle agitation. Conditioning with collecting and frothing agents is also preferably carried out at a medium temperature with gentle agitation and with aeration where desired. While the temperature at which flotation is carried out is in no sense limiting, it has been found desirable to float under conditions of gentle agitation at a temperature between 5° and 50° C., the preferred temperature within this range being 40° C.

It will be appreciated of course that the concentrates produced according to the invention may be cleaned and recleaned in known manner if this is desired.

The precise mechanics of the reactions involved during the early stages of the process of the invention are not known although work directed to the ascertainment of the nature of these reactions has indicated that they are complex in nature and that oxygen is absorbed by the pulp during the treatment. Moreover, it has been found that although compounds of sulphur and oxygen are produced in solution during the air treatment, it was not found necessary to remove these soluble products in order to obtain good results, as was the case in previous practice. Furthermore, it has not been found of any benefit to avoid the presence of frothers during any of the preparation stages of the process. This will be apparent from the consideration of Example 1 in which a pulp was used which was made up of a copper concentrate. Due to the well known ability of xanthate and dithiophosphate reagents to follow the concentrate, it would be expected that some of these reagents would be present in the concentrate from which the pulp was made up. The presence of these reagents, however, did not prevent the attainment of the good results recorded.

The practice of the invention is illustrated in the following examples which are given for purposes of illustration only.

*Example 1.*—A copper concentrate pulp was prepared using xanthate and dithiophosphate type reagents and containing 60% solids of the following analysis:

| | Per cent |
|---|---|
| Copper | 12.49 |
| Zinc | 4.44 |
| Iron | 30.0 |
| Insoluble Material | 13.3 |

The chief materials were chalcopyrite, sphalerite, marmatite, pyrite, pyrrhotite and siliceous gangue.

The pulp was heated to 90 to 95° C. and treated with air while agitating violently for 30 minutes. It was then cooled to 70° C., by diluting with cold water, sufficient lime was added to give a pH of 10 to 11 in the subsequent flotation stage, and air was blown in while agitating gently for 5 minutes. The pulp was treated with 3 pounds per ton of copper sulphate and air and gentle agitation was continued for a further 5 minutes. Sodium Aerofloat and a frothing agent were added, and the air treatment and gentle agitation were continued for another 2 minutes. The pulp was then cooled to 40° C. by adding more cold water and a zinc concentrate was floated off while agitating gently. This concentrate was treated with a small additional amount of lime and cleaned and recleaned.

The results were tabulated as follows:

| Product | Bulk Per Cent | Assays, Per Cent | | Extractions, Per Cent | |
|---|---|---|---|---|---|
| | | Cu | Zn | Cu | Zn |
| Zinc Recleaner Concentrate | 7.6 | 4.45 | 44.3 | 2.7 | 75.9 |
| Zinc Recleaner Tails | 2.5 | 8.91 | 13.1 | 1.8 | 7.4 |
| Zinc Cleaner Tails | 9.9 | 7.96 | 4. | 6.3 | 10.6 |
| Zinc Rougher Tails | 80.0 | 13.93 | 0.34 | 89.2 | 6.1 |
| Feed | 100.0 | 12.49 | 4.44 | 100.0 | 100.0 |

It is seen, that even if the recleaner and cleaner tails were combined with the rougher tails an excellent result has been obtained. In practice, of course, the recleaner and cleaner tails would be recirculated through the process.

*Example 2.*—A pulp was made up from Hudson Bay Mining and Smelting Co., Limited, mill feed assaying as follows:

| | | |
|---|---|---|
| Gold | ounces per ton | 0.035 |
| Silver | do | 0.96 |
| Copper | percent | 1.69 |
| Zinc | do | 3.48 |
| Insolubles | do | 21.85 |
| Iron | do | 27.09 |

3000 gms. of ore was crushed to pass a screen of 10 meshes to the inch and then ground in a ball mill with lime and addition of water until 75% of the sample passed a screen of 325 meshes to the inch.

The sample was placed in a flotation cell and air, at the rate of 0.08 cubic feet per minute was blown through for 30 minutes, the temperature being maintained at 90 degrees centigrade. In this operation the pulp density was 50% solids. At the end of the 30 minutes lime was added, the temperature was lowered to 70° C. aeration being continued at the rate of 1.0 cubic feet per minute for five minutes. Then 3.2 pounds per ton of solids of copper sulphate was added and aeration was continued at the same rate for a further five minutes. Sodium aerofloat and a frothing agent were then added and aerated for two minutes. Finally the pulp was diluted to 28.6% solids and a rougher concentrate was taken off at pH 10.8. This concentrate was cleaned and recleaned. The results were as follows:

| | Bulk Per Cent | Assays | | | | Extractions—Per Cent | | | |
|---|---|---|---|---|---|---|---|---|---|
| | | Au oz./ton | Ag oz./ton | Cu Per Cent | Zn Per Cent | Au | Ag | Cu | Zn |
| Zinc Recleaner Concentrate | 5.8 | 0.045 | 1.59 | 2.42 | 44.5 | 7.3 | 9.6 | 8.3 | 73.7 |
| Zinc Recleaner Tails | 1.3 | 0.050 | 2.96 | 4.58 | 11.9 | 1.7 | 4.0 | 3.5 | 4.3 |
| Zinc Cleaner Tails | 6.5 | 0.030 | 1.99 | 3.78 | 9.8 | 5.4 | 13.5 | 14.5 | 18.3 |
| Zinc Rougher Tails | 86.4 | 0.035 | 0.81 | 1.44 | 0.15 | 85.6 | 72.9 | 73.7 | 3.7 |

The times, temperatures, and reagents employed in these examples were those chosen by trial and error methods for these particular materials. The details of the process require variation for other materials, keeping always in mind the principles upon which the process is based. The determination of the best conditions for any specific material may of course be made by the usual methods of flotation testing.

We claim:

1. A process for the separation of zinc sulphide minerals from pulps containing said minerals and other metallic sulphides and non-sulphides comprising: de-activating the mineral particles in the pulp by aeration at a temperature of from about 80° C. to about 100° C. and violent agitation for an extended period of time; selectively re-activating the sulphide mineral particles at a temperature of from about 60° C. to about 80° C. by treatment of the pulp with an alkalizing agent with aeration and gentle agitation, and addition of copper sulphate with gentle agitation; and floating the zinc sulphide minerals under conditions of gentle agitation.

2. A process as defined in claim 1 in which the pulp is conditioned while still at a temperature of from about 60° C. to about 80° C. with a collecting agent and a frothing agent, under conditions of gentle agitation.

LUTHER G. HENDRICKSON.
PERCY L. DIXON.
BURTON E. LYLE.

REFERENCES CITED

The following references are of record in the file of this patent:

UNITED STATES PATENTS

| Number | Name | Date |
|---|---|---|
| 835,120 | Sulman et al. | Nov. 6, 1906 |
| 1,543,620 | Rawson et al. | June 23, 1925 |
| 1,893,517 | Gaudin | Jan. 10, 1933 |
| 1,950,537 | Barthelemy | Mar. 13, 1934 |
| 2,430,778 | Moyer | Nov. 11, 1947 |